(12) United States Patent
Mailoa et al.

(10) Patent No.: US 11,376,565 B2
(45) Date of Patent: Jul. 5, 2022

(54) CONDUCTIVE, ANTI-CORROSIVE MAGNESIUM TITANIUM OXIDE CATALYST SUPPORT MATERIAL

(71) Applicant: Robert Bosch GmbH, Stuttgart (DE)

(72) Inventors: Jonathan Mailoa, Cambridge, MA (US); Soo Kim, Cambridge, MA (US); Boris Kozinsky, Waban, MA (US)

(73) Assignee: ROBERT BOSCH GMBH, Stuttgart (DE)

( * ) Notice: Subject to any disclaimer, the term of this patent is extended or adjusted under 35 U.S.C. 154(b) by 271 days.

(21) Appl. No.: 16/724,860

(22) Filed: Dec. 23, 2019

(65) Prior Publication Data
US 2021/0129114 A1   May 6, 2021

Related U.S. Application Data

(63) Continuation-in-part of application No. 16/675,564, filed on Nov. 6, 2019.

(51) Int. Cl.
*B01J 21/10* (2006.01)
*B01J 37/02* (2006.01)
(Continued)

(52) U.S. Cl.
CPC .............. *B01J 21/10* (2013.01); *B01J 23/42* (2013.01); *B01J 37/0018* (2013.01);
(Continued)

(58) Field of Classification Search
CPC ............ H01M 4/8605; H01M 4/8657; H01M 4/8814; H01M 4/8825; H01M 4/8871;
(Continued)

(56) References Cited

U.S. PATENT DOCUMENTS 5,180,285 A   1/1993 Lau
5,942,348 A   8/1999 Jansing et al.
(Continued)

FOREIGN PATENT DOCUMENTS

WO    2019068110 A1    4/2019

OTHER PUBLICATIONS

Shirman et al., "Modular Design of Advanced Catalytic Materials Using Hybrid Organic-Inoganic Raspberry Particles," Advanced Functional Materials, 2018, 28, 1704559 (20 pages).
(Continued)

*Primary Examiner* — Sarah A. Slifka
*Assistant Examiner* — Rachel L Zhang
(74) *Attorney, Agent, or Firm* — Brooks Kushman P.C.

(57) ABSTRACT

A method of forming a fuel cell catalyst system, the method includes providing an anticorrosive, conductive catalyst support material having oxygen vacancies and a formula (I):

$$MgTi_2O_{5-\delta} \qquad (I),$$

where $\delta$ is any number between 0 and 3 optionally including a fractional part denoting the oxygen vacancies, coating the catalyst support material with a polymeric film, attaching a catalyst material onto the polymeric film, removing the polymeric film, and providing additional material onto the support material to increase physical, electrical, and/or mechanical contact between the catalyst material and the catalyst support material.

14 Claims, 9 Drawing Sheets

(51) Int. Cl.
    *B01J 37/00*     (2006.01)
    *B01J 23/42*     (2006.01)
    *H01M 4/88*     (2006.01)
    *H01M 4/86*     (2006.01)
    *H01M 4/90*     (2006.01)

(52) U.S. Cl.
    CPC ....... *B01J 37/0217* (2013.01); *B01J 37/0221* (2013.01); *H01M 4/8657* (2013.01); *H01M 4/8803* (2013.01); *H01M 4/8817* (2013.01); *H01M 4/8871* (2013.01); *H01M 4/9041* (2013.01)

(58) Field of Classification Search
    CPC .. H01M 4/8889; H01M 4/9041; H01M 4/921; H01M 4/925; B01J 21/10; B01J 23/42; B01J 37/0018; B01J 37/0217; B01J 37/0221
    See application file for complete search history.

(56) References Cited

U.S. PATENT DOCUMENTS

| | | | |
|---|---|---|---|
| 5,958,616 | A | 9/1999 | Salinas et al. |
| 7,736,791 | B1 | 6/2010 | Merz |
| 8,062,552 | B2 | 11/2011 | Adzic et al. |
| 9,017,576 | B2 | 4/2015 | Biausque et al. |
| 9,048,465 | B2 | 6/2015 | Bang et al. |
| 9,579,636 | B1 | 2/2017 | Roy et al. |
| 9,742,010 | B2 | 8/2017 | Ho et al. |
| 10,265,694 | B2 | 4/2019 | Aizenberg et al. |
| 2006/0263675 | A1 | 11/2006 | Adzic et al. |
| 2012/0264027 | A1 | 10/2012 | Mizukami et al. |
| 2013/0040129 | A1 | 2/2013 | Jin et al. |
| 2015/0354072 | A1 | 12/2015 | Suchsland et al. |
| 2017/0314141 | A1 | 11/2017 | Xu |
| 2018/0166698 | A1* | 6/2018 | Kim .................. H01M 4/9083 |

OTHER PUBLICATIONS

Shirman et al., "New Architectures for Designed Catalysts: Selective Oxidation using AgAu Nanoparticles on Colloid-Templated Silica," Chem. Eur. J., 2018, 24, 1833-1837.

Mailoa et al., "Textured conducting Glass by Nanosphere Lithography for Increased Light Absorption in Thin-film solar Dells," J. Phys. D. Appl. Phys., 47, 2014, 085105.

Suzuki, Yoshikazu et al., "Magnesium Dititanate (MgTi2O5) with pseudobrookite structure: a review", Science and Technology of Advanced Materials, 12 (2011) 034301. 6 pages.

Isobe, Masahiko et al., "Synthesis, Structure and Physical Properties of Spinel Solid Solutions Mg2TiO4—Mg—Ti2O4", Journal of Alloys and Compounds 383 92004) pp. 85-88. 5 pages.

Tanaka, Yasuo, "Studies on the Reactions Between Oxides in Solid State at Higher Temperatures. I. The Reaction between Magnesium Oxide and Titanium Oxide.", Bulletin of the Chemical Society of Japan, 1941, vol. 16, No. 11, pp. 428-441. 15 pages. https://www.journal.csj.jp/doi/abs/10.1246/bdsj.16.428.

Davies, J.C. et al., "Stabilising Oxide Core—Platinum Shell Catalysts for the Oxygen Reduction Reaction," Electrochimica Acta 248 (2017) 470-477. 8 Pages.

Bandura, A.V. et al., "Comparisons of Multilayer H2O Adsorption onto the (110) Surfaces of α-TiO2 and SnO2 as Calculated with Density Functional Theory", J. Phys. Chem. B 112 (2008) 11616. 9 Pages.

https://en.wikipedia.org/wiki/Segregation_(materials science) Year: 2020.

* cited by examiner

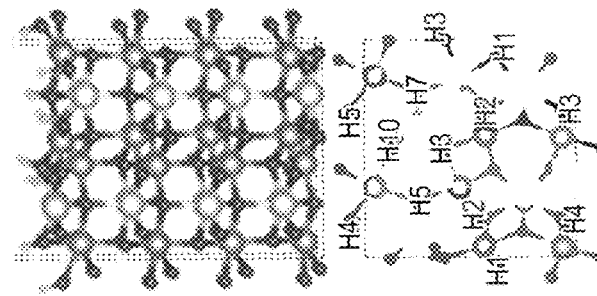
FIG. 5A MgTi$_2$O$_5$
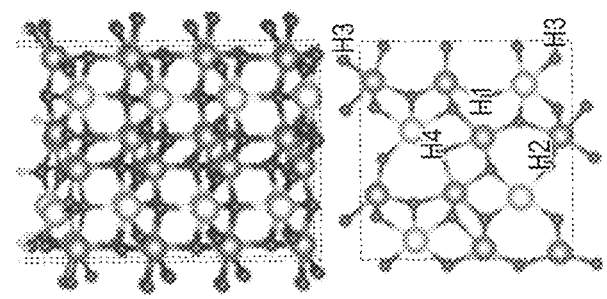
FIG. 5B MgTi$_2$O$_{5-\delta}$
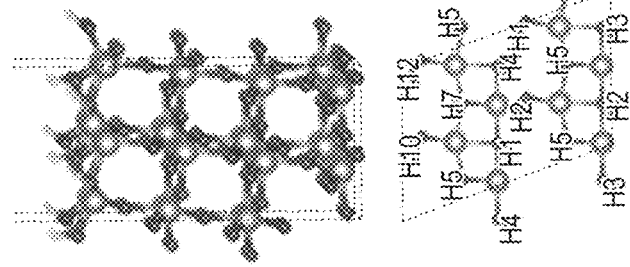
FIG. 5C TiO$_2$ (anatase)
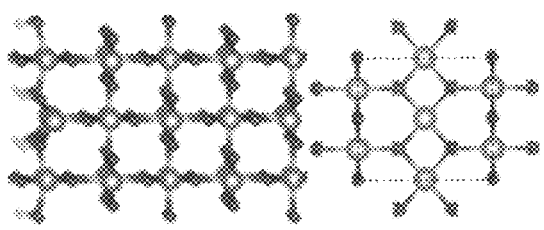
FIG. 5D TiO$_2$ (rutile)
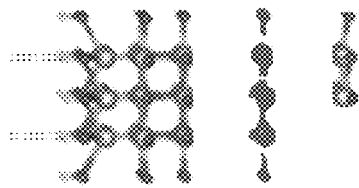
FIG. 5E TiO
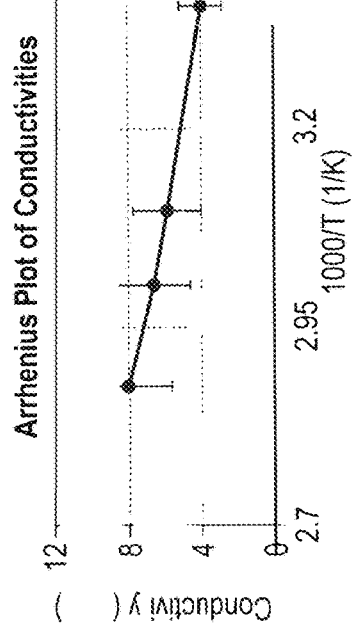
FIG. 6

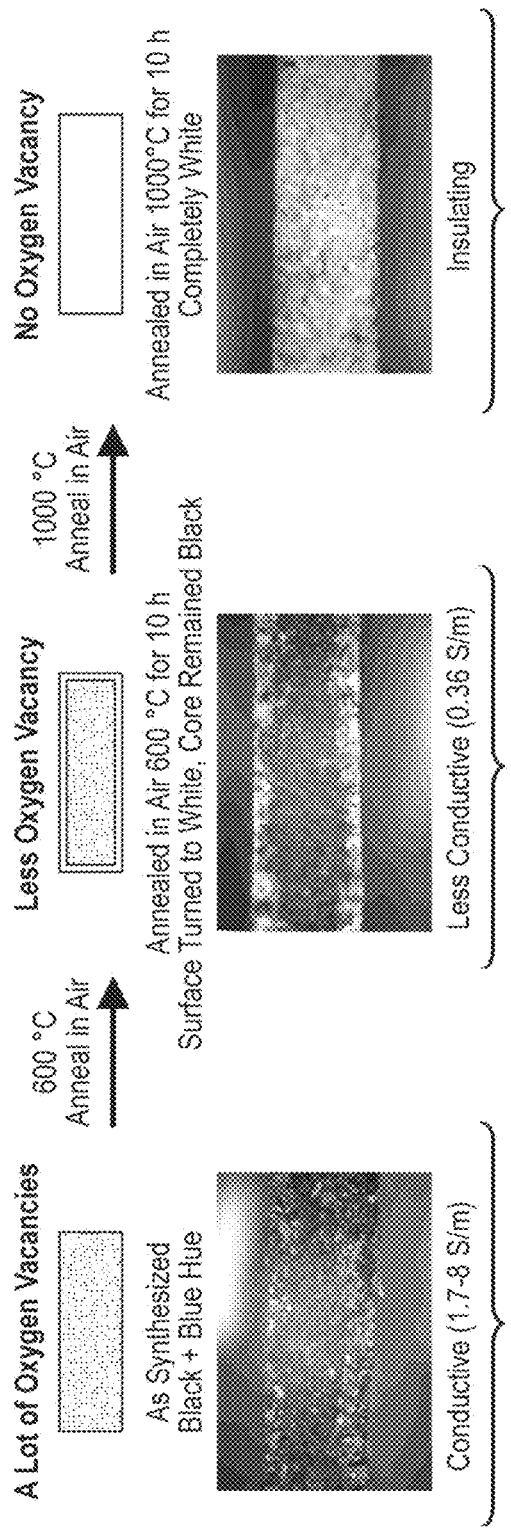
FIG. 9A FIG. 9B FIG. 9C
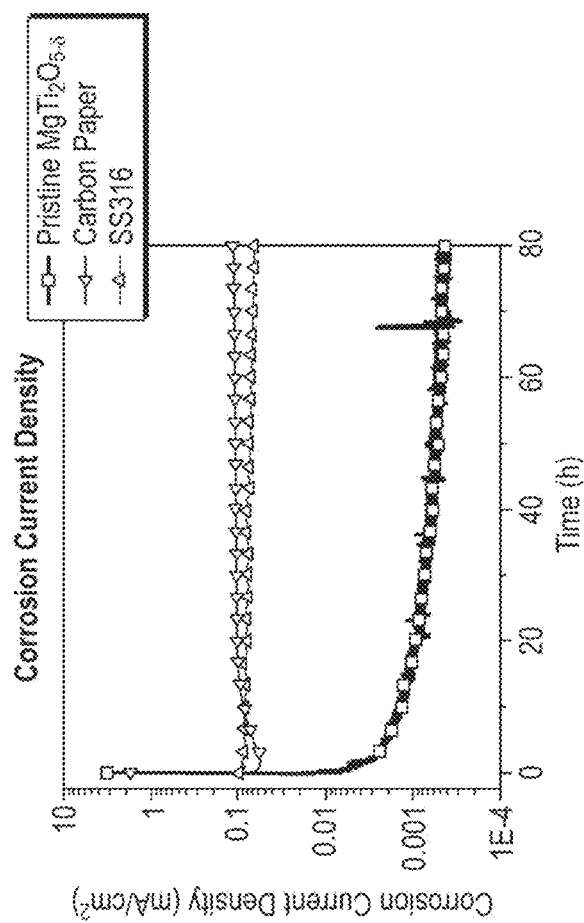
FIG. 10

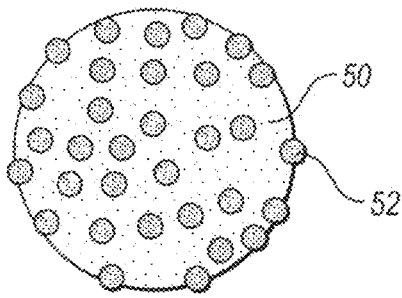
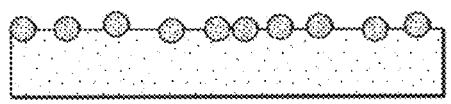
FIG. 11A
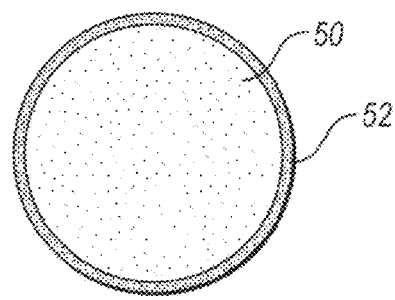
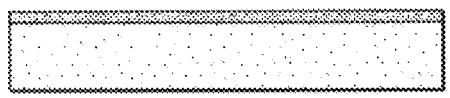
FIG. 11B
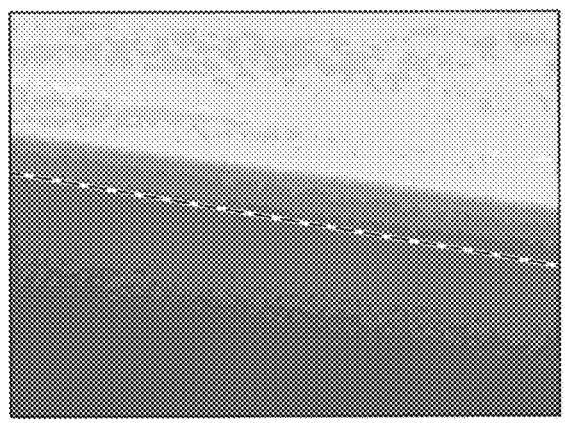
FIG. 12A
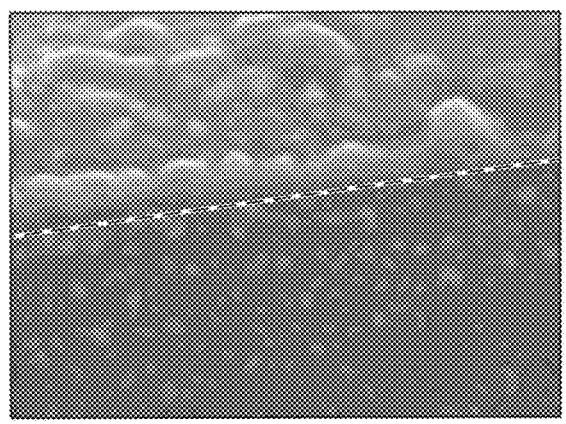
FIG. 12B

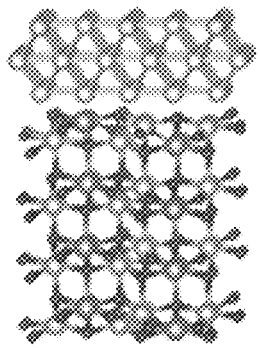
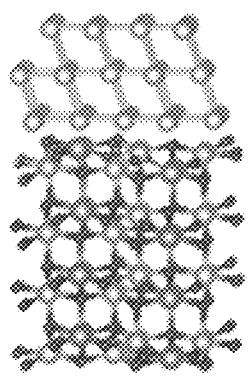
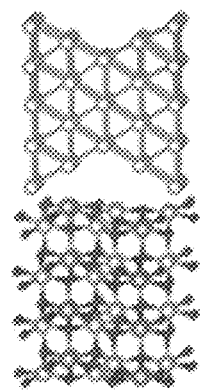
FIG. 13A  FIG. 13B  FIG. 13C
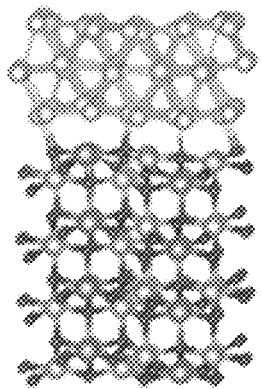
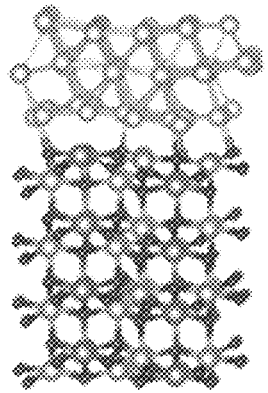
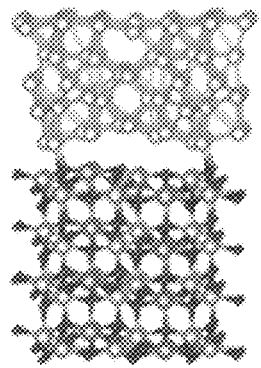
FIG. 13D  FIG. 13E  FIG. 13F
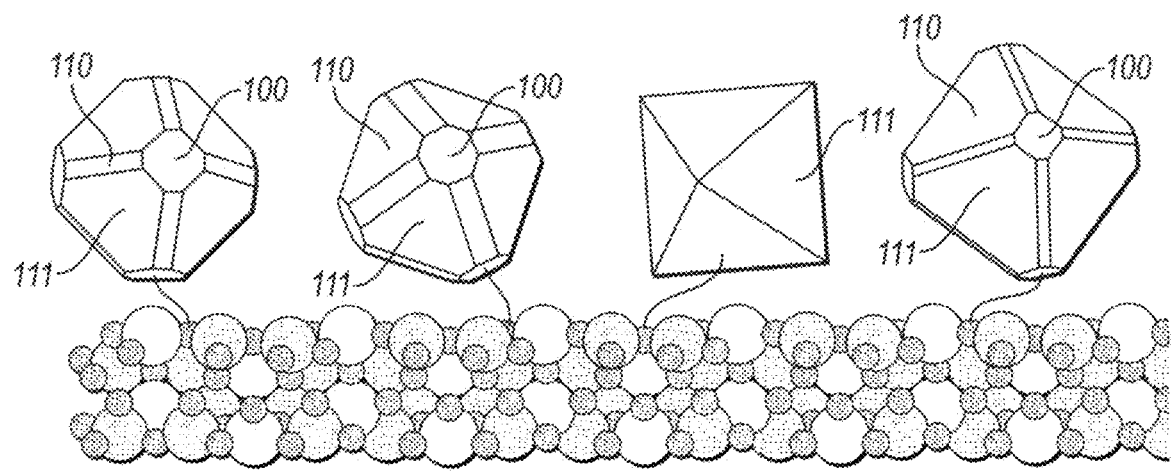
FIG. 14

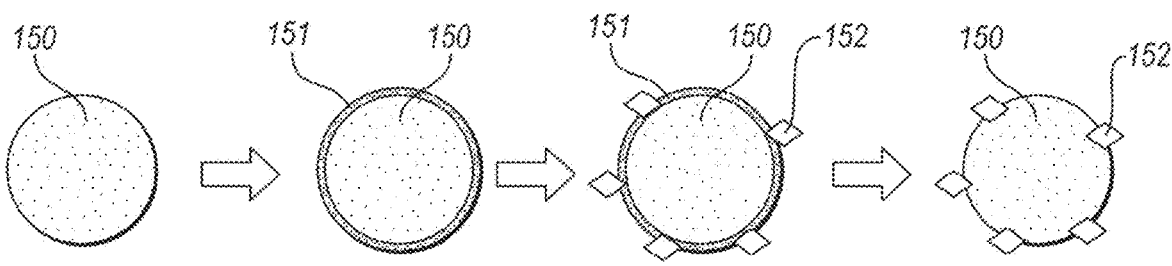
FIG. 15A
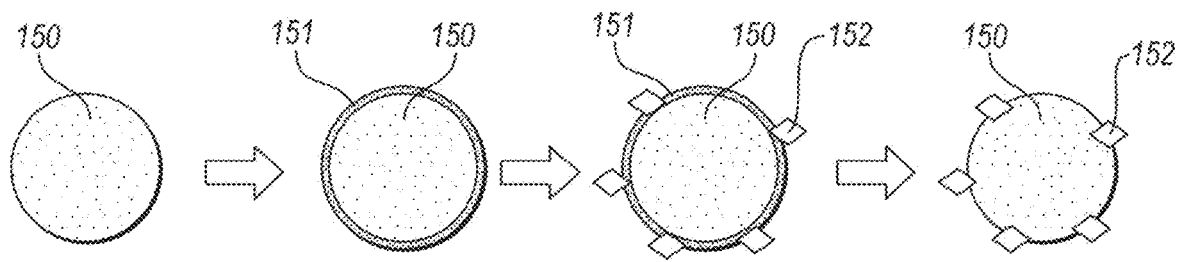
FIG. 15B
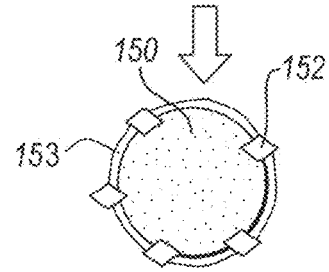
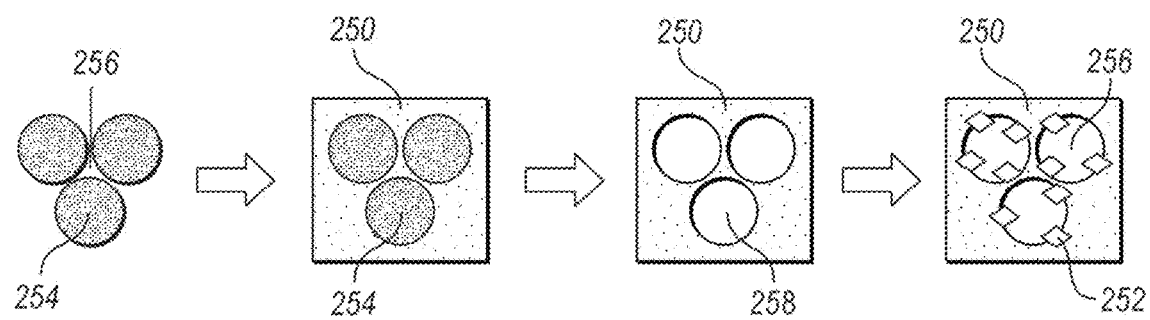
FIG. 16

CONDUCTIVE, ANTI-CORROSIVE MAGNESIUM TITANIUM OXIDE CATALYST SUPPORT MATERIAL

RELATED APPLICATIONS

The present application is a continuation-in-part of U.S. patent application Ser. No. 16/675,564 filed on Nov. 6, 2019, which is incorporated by reference in its entirety herein.

TECHNICAL FIELD

The present disclosure relates to a catalyst support including an anti-corrosive, electrically conductive magnesium titanium oxide material with oxygen vacancies and a method of producing the same.

BACKGROUND

Catalytic materials or catalysts such as precious metals have become essential in many applications, one of them being a proton-exchange-membrane fuel cell (PEMFC). Precious metals and other catalysts are typically expensive materials and their loss from a system within which they are applied usually translates into lesser activity and efficiency. Thus, various attempts have been made to retain the catalytic material within a given application to produce longer-lasting systems such as fuel cells.

SUMMARY

According to one embodiment, a method of forming a fuel cell catalyst system is disclosed. The method includes providing an anticorrosive, conductive catalyst support material having oxygen vacancies and a formula (I):

$$MgTi_2O_{5-\delta} \qquad (I),$$

where $\delta$ is any number between 0 and 3 optionally including a fractional part denoting the oxygen vacancies. The method may further include coating the catalyst support material with a polymeric film. The method may also include attaching a catalyst material onto the polymeric film. The method may further include removing the polymeric film. The method may likewise include providing additional material to increase physical, electrical, and/or mechanical contact between the catalyst material and the catalyst support material. The additional material may include a catalyst support material. The polymeric material may be polystyrene. The removing may include heating the catalyst system above a threshold temperature. The threshold temperature may be a melting temperature of the polymeric material. The catalyst support material may further include at least one additional oxide, carbide, or intermetallic compound. The catalyst material may include a Pt-M bimetallic alloy, where M is Ag, Au, Bi, Co, Cr, Cu, Fe, Ge, Hf, Ir, Mn, Mo, Nb, Ni, Os, Pd, Re, Rh, Ru, Sb, Sn, Ta, Ti, V, or W. The attaching may include contacting at least some of the catalyst material with the catalyst support material.

In an alternative embodiment, a method of forming a fuel cell catalyst system is disclosed. The method may include forming a templating material layer including a plurality of initial pores. The method may also include depositing an anticorrosive, conductive catalyst support material within the initial pores, the catalyst support material having oxygen vacancies and a formula (I):

$$MgTi_2O_{5-\delta} \qquad (I),$$

where $\delta$ is any number between 0 and 3 optionally including a fractional part denoting the oxygen vacancies. The method may further include forming a catalyst support material matrix having secondary pores by removing the templating material from the system. The method may also include depositing a catalyst material within the secondary pores. The templating material may include a plurality of nanospheres. The method may further include fusing the templating material. The depositing of the catalyst material may include sputtering. The removing may include dissolving of the templating material in an acid. The method may further include annealing the system in an oxygen-free atmosphere.

In yet another embodiment, a method of forming a fuel cell catalyst system is disclosed. The method may include synthesizing catalyst support nanoparticles including an anticorrosive, conductive material having oxygen vacancies and a formula (I):

$$MgTi_2O_{5-\delta} \qquad (I),$$

where $\delta$ is any number between 0 and 3 optionally including a fractional part denoting the oxygen vacancies. The method may further include forming a polymeric layer around each of the nanoparticles. The method may also include subsequently attaching a plurality of catalyst nanoparticles onto the polymeric layer such that at least some of the catalyst nanoparticles are in contact with the catalyst support nanoparticles. The method may further include removing the polymeric layer. The removing may include annealing the catalyst system in an oxygen-free atmosphere. The polymeric layer may include polystyrene. The removing may include heating the catalyst system above a threshold temperature. The threshold temperature may be a melting temperature of the polymeric layer. The catalyst nanoparticles may include a Pt-M bimetallic alloy, where M is Ag, Au, Bi, Co, Cr, Cu, Fe, Ge, Hf, Ir, Mn, Mo, Nb, Ni, Os, Pd, Re, Rh, Ru, Sb, Sn, Ta, Ti, V, or W.

BRIEF DESCRIPTION OF THE DRAWINGS

FIGS. 5A through 5E show chemical structures of (110) $MgTi_2O_5$, (110) $MgTi_2O_{5-\delta}$, (101) $TiO_2$ (anatase), (110) $TiO_2$ (rutile), and (001) TiO;

FIG. 6 shows an Arrhenius plot of conductivities from 25° C. to 80° C. for $MgTi_2O_{5-\delta}$;

FIGS. 9A through 9C are photographs of as-synthesized $MgTi_2O_{5-\delta}$, $MgTi_2O_{5-\delta}$ after being annealed at 600° C. in air, and $MgTi_2O_{5-\delta}$ after being annealed at 1000° C. in air;

FIG. 10 shows a comparison plot of corrosion current density of pristine $MgTi_2O_{5-\delta}$, carbon paper, and polished stainless steel (SS) 316;

FIGS. 11A and 11B show schematic depictions of $MgTi_2O_{5-\delta}$ as a catalyst support material with a catalyst being deposited as islands or in a core-shell structure, respectively;

FIGS. 12A and 12B are scanning electron microscope (SEM) cross-section images of Pt being sputtered on a non-limiting example of a $MgTi_2O_{5-\delta}$ pellet before and after annealing;

FIGS. 13A through 13F show first-principles density functional theory (DFT)-constructed interfaces before and after DFT relaxation between $MgTi_2O_{5-\delta}$ and Pt surfaces;

FIG. 14 shows schematic depictions of various Pt particles/facets attached to $MgTi_2O_{5-\delta}$ oxide support;

FIGS. 15A and 15B depict schematic non-limiting examples of a synthesis route for catalyst support nanoparticle material with catalyst nanoparticles; and FIG. 16 shows a schematic non-limiting example of a formation of an acid-resistant $MgTi_2O_{5-\delta}$ matrix forming a catalyst support.

DETAILED DESCRIPTION

Figure 1:
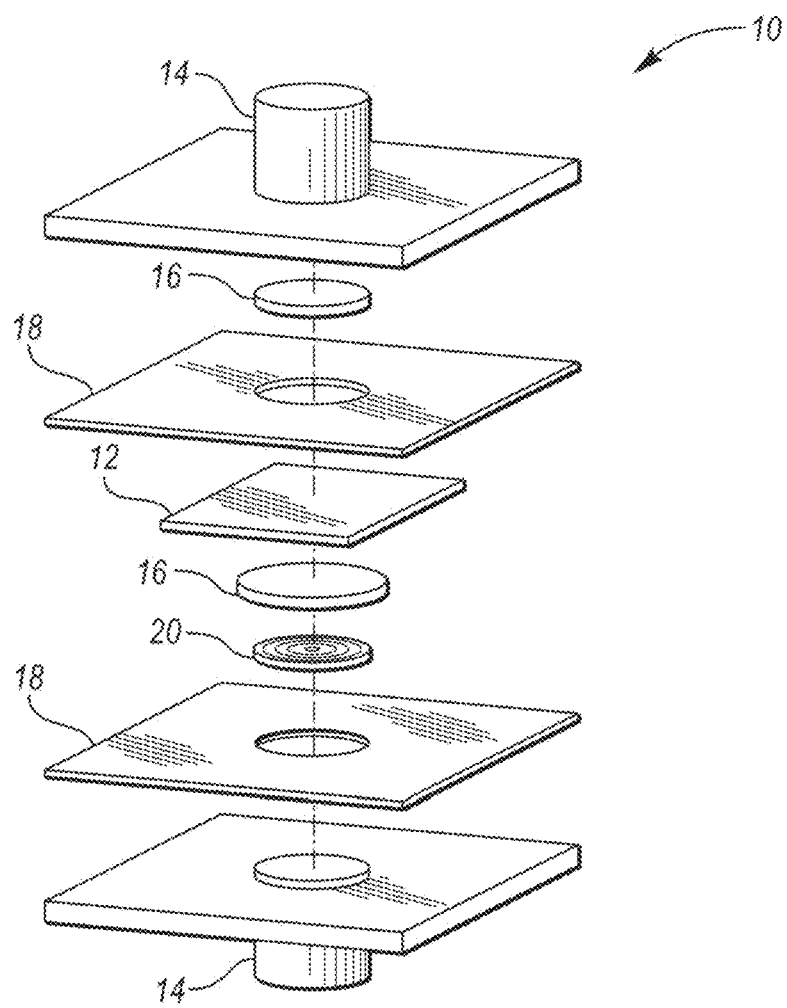
FIG. 1 depicts a schematic composition of a proton-exchange-membrane fuel cell (PEMFC) including a bipolar plate according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Corrosion is a natural process which converts a refined metal to a more chemically-stable form such as the metal's oxide(s), hydroxide(s), sulfide(s), and/or other salts. The conversion presents a gradual destruction of the metal material caused by electrochemical oxidation of the metal in a reaction with an oxidant such as oxygen or sulfates. Corrosion may be invoked by exposure of the metal substrate to moisture in the air, to a solution with a relatively low pH, various chemical substances such as acids, microbes, elevated temperatures, and/or other factors. Especially in acidic environments, corrosion starts at the interface between a bulk metal material (e.g., steel) and a solution (e.g., ions dissolved in water or water surface layer which react to degrade the bulk material).

Some applications are highly susceptible to corrosion due to their environmental factors. A non-limiting example of such application are PEMFCs. A PEMFC represents an environmental-friendly alternative to internal combustion engines for a variety of vehicles such as cars and buses. A PEMFC typically features a relatively high efficiency and power density. A very attractive feature of the PEMFC engine are no carbon emissions, provided that the hydrogen fuel has been gained in an environmentally-friendly manner. Besides being a green engine, the PEMFC may be used in other applications such as stationary and portable power sources.

The PEMFC's own operating environment lends itself to corrosion for a variety of reasons. For example, low voltages exist between startups and shutdowns of the PEMFC, PEMFC has a strongly acidic environment, fluorine ions are released from the polymer membrane during operation of the PEMFC, both $H_2$ and $O_2$ exist at the anode during the startup and shutdown which causes high cathodic potential yielding cathodic corrosion, fuel crossover of hydrogen or oxygen from the anode to cathode or vice versa, etc. The PEMFC thus requires durable components capable of withstanding the above-mentioned conditions.

A non-limiting example of a PEMFC is depicted in FIG. 1. A core component of the PEMFC 10 that helps produce the electrochemical reaction needed to separate electrons is the Membrane Electrode Assembly (MEA) 12. The MEA 12 includes subcomponents such as electrodes, catalysts, and polymer electrolyte membranes. Besides MEA 12, the PEMFC 10 typically includes other components such as current collectors 14, gas diffusion layer(s) 16, gaskets 18, and bipolar plate(s) 20.

Figure 2A:
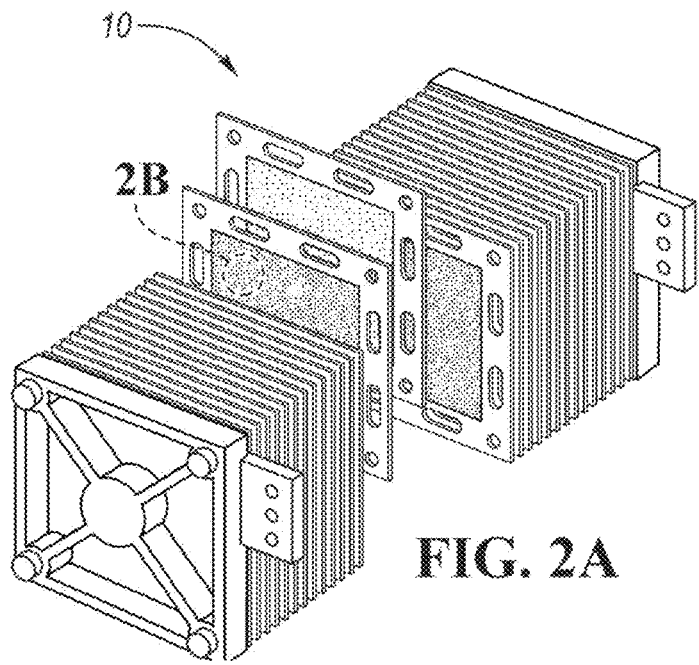
FIG. 2A shows a schematic depiction of a catalyst system placement within a PEMFC.
Figure 2B:
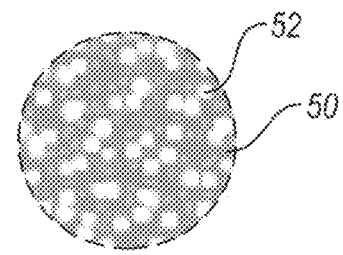
FIG. 2B shows a detailed view of the catalyst system of FIG. 2A having a catalyst support material with catalyst particles attached.

In one or more non-limiting embodiments, the herein-disclosed material may be used as a catalyst support in a PEMFC. FIG. 2 shows a schematic example catalyst support material 50 with a catalyst 52 incorporated within a PEMFC 10. In a PEMFC, an anode and a cathode each may include a catalyst facilitating the reactions of oxygen and hydrogen. The anode catalyst oxidizes the fuel into the hydrogen protons and electrons at the anode while the cathode catalyst catalyzes oxygen reduction reaction which results in formation of water. Due to a more complicated chemistry at the cathode, a higher loading of a catalyst is usually needed at the cathode than at the anode to increase the reaction speed.

A suitable catalyst must be stable enough to withstand the corrosive environment at the cathode as well as be sufficiently chemically active to be able to reduce $O_2$. The catalyst must be also selective enough to produce the desired product while minimizing production of undesirable intermediates. The catalyst layer should be also capable of facilitating release of product water from the catalyst surface to free up catalytic sites once the reaction is complete.

A variety of noble metals have been used as a catalyst. The most commonly-used catalyst is platinum (Pt) due to its excellent catalytic activity and moderate stability to withstand harsh operating condition. Indeed, Pt is one of the few elements capable of withstanding the acidic (PH<2) operation environment of a fuel cell.

Typically, to increase stability of the catalysts and to prevent their physical detachment from the system, the catalyst materials are usually affixed to catalyst support materials, which are typically solid materials with a high surface area. The catalyst support itself needs to be inert to prevent affecting the catalytic reactions. The most common catalyst supports for PEMFC include graphite, carbon nanofibers, carbon nanotubes, nanospheres, nanoellipsoids, nanorods, the like, or a combination thereof.

Yet, oxidation of these support materials under the fuel cell operating conditions may occur, especially during the start-up/shutdown processes, which may in turn lead to degradation of the catalyst which may be limiting the PEMFC lifetime. For carbon-base supports, the phenomenon is known as carbon corrosion. Therefore, various metal oxides have been studied as a possible alternative catalyst support, as opposed to carbon, due to their tendency to improve the catalyst stability and resistance against further oxidation.

Any catalyst support material needs to meet certain criteria—to be stable in the PEMFC operating conditions, which is usually acidic (i.e., low pH, from pH 1 to 4), and to withstand different voltages which are being applied to the fuel cell (typically, 0 V up to ~1.2 V vs. SHE).

Among different metal oxides to be used as catalyst support materials in a PEMFC electrode, $TiO_2$ and $SnO_2$ have been disclosed as leading candidates. This is due to their stability in the aqueous electrochemical system for $TiO_2$ and $SnO_2$: forming a stable oxide where pH can vary from 1 to 4 (i.e., acidic) and voltages between 0 to 1.23 V can also affect the local environment during the PEMFC operation. Recently, Sn-doped $TiO_2$ was also tested as a catalyst support material for Pt catalyst and reported the following: 1) doping up to 10% Sn in $TiO_2$ resulted in an increase in the mass activity; 2) catalyst support with 23 to 40% Sn doping in $TiO_2$ required much less platinum; and, 3) Sn-doped $TiO_2$ was stable in the acidic conditions at 80° C. at <28% doping of Sn in $TiO_2$.

The material disclosed herein solves one or more problems described above and/or provides the benefits identified herein. It was surprisingly discovered that the disclosed material provides anticorrosive, conductive properties to a substrate. The material encompasses a variety or a series of compounds such as Mg—Ti compounds with different contents of oxygen vacancies or, in other words, compounds with a variety of oxygen-deficient stoichiometries.

The disclosed material may be used for catalysis in a variety of applications including PEMFC, anion exchange membrane fuel cell (AEMFC), either at the cathode or the anode, proton exchange membrane electrolyzer, chemical synthesis, air purification including purifying exhaust from an internal combustion engine, photo-catalysis for water splitting cells, or photo-catalysis of redox media for water cleaning.

In one or more embodiments, the materials disclosed herein of formula (I) may be used as a metal oxide support for a PEMFC catalyst in the fuel cell application, on a cathode, anode, or both. The catalyst may be a noble metal or noble-metal free catalyst. The catalyst may include a pure metal such as pure Pt. A non-limiting example of a catalyst may be Pt, Pd, Au, Ir, Rh, Ru, or a combination thereof. The catalyst may be an oxidation reduction reaction (ORR) catalyst.

The catalyst material may be a Pt-M bimetallic alloy, where M may be Ag, Au, Bi, Co, Cr, Cu, Fe, Ge, Hf, Ir, Mn, Mo, Nb, Ni, Os, Pd, Re, Rh, Ru, Sb, Sn, Ta, Ti, V, or W. The catalyst may be a combination of catalysts. The catalyst material may be in a form of nanoparticles to be deposited onto the $MgTi_2O_{5-\delta}$ metal oxide catalyst support material. The catalyst nanoparticles may have a size of about or at least about 1 to 7 nm, 2 to 6 nm, or 3 to 5 nm. The catalyst nanoparticles' radius or diameter may be about or at least about 1 to 7 nm, 2 to 6 nm, or 3 to 5 nm. The catalyst nanoparticles' radius or diameter may be about or at least about 0.1, 0.5, 1, 1.5, 2, 2.5, 3, 3.5, 4, 4.5, 6, 6.5, or 7 nm.

The disclosed material may be a Mg—Ti—O-based material. The disclosed material may have a formula (I):

$$MgTi_2O_{5-\delta} \qquad (I),$$

where

δ is any number between 0 and 3 optionally including a fractional part such as decimals and/or hundredths and denotes oxygen vacancies. δ may be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. δ may be any number between 0 and 3 including tenths, hundredths, or both. δ may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.0, 2.01, 2.02, 2.03, 2.04, 2.05, 2.06, 2.07, 2.08, 2.09, 2.1, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 0.30, 2.31, 2.32, 2.33, 2.34, 2.35, 2.36, 2.37, 2.38, 2.39, 2.40, 2.41, 2.42, 2.43, 2.44, 2.45, 2.46, 2.47, 0.48, 2.49, 2.50, 2.51, 2.52, 2.53, 2.54, 2.55, 2.56, 2.57, 2.58, 2.59, 2.60, 2.61, 2.62, 2.63, 2.64, 2.65, 0.66, 2.67, 2.68, 2.69, 2.70, 2.71, 2.72, 2.73, 2.74, 2.75, 2.76, 2.77, 2.78, 2.79, 2.80, 2.81, 2.82, 2.83, 0.84, 2.85, 2.86, 2.87, 2.88, 2.89, 2.90, 2.91, 2.92, 2.93, 2.94, 2.95, 2.96, 2.97, 2.98, 2.99, or 3.00.

δ may be a range including any number named above while excluding at least one number mentioned above. For example, δ may equal 0.1 to 3.0 with the exclusion of 1 and 2. In an alternative example, δ may include one or more ranges of 0.1 to 0.9, 1.1 to 1.9, or 2.1 to 2.9. In a yet another non-limiting example, δ may include one or more ranges of 0.01 to 0.99, 1.10 to 1.99, or 2.10 to 2.99.

In one or more embodiments, the oxygen vacancies within the material contribute to beneficial properties of the material. Thus, the oxygen vacancies are formed and preserved on purpose, and processes which would eliminate presence of oxygen vacancies may be avoided or excluded during the material synthesis and/or subsequent use.

Oxygen vacancies in the material may be characterized as a quantitatively smaller amount of oxygen atoms present in the material than expected in the parent material's crystal lattice. Oxygen vacancies are typically formed by removing an oxygen from a compound of oxygen, for example by annealing in a reducing atmosphere of $N_2$, Ar, or the like. In another embodiment, annealing may be carried out in a vacuum furnace. The oxygen vacancies may render the material non-stoichiometric or deviating from stoichiometry such that the elemental composition of the material may not be represented by a ratio of well-defined natural numbers. The material; however, may be stoichiometric.

In some applications, oxygen vacancies may be perceived as undesirable defects influencing structural, electrical, optical, dissociative and reductive properties, or other properties in a manner which is not suitable for various applications. In contrast, the materials disclosed herein have desirable properties due to oxygen vacancies being present. While a base or parent compound and a material with oxygen vacancies may have common morphology, structure, or lattice to a certain degree, their properties may significantly differ. Such is the case with the disclosed material having oxygen-deficient stoichiometry. The material has crystalline structure alike the parental $MgTi_2O_5$ phase. But even the crystalline structure differs due to the oxygen deficiencies. For example, the disclosed material's lattice may include extra bonds or lack bonds in spaces where the paternal phase includes a bond. An example of the structural differences of the parental and the disclosed material may be seen in FIG. 5. In FIG. 5, dark gray large circles represent Ti atoms, light gray large circles represent Mg, small black circles represent O atoms, and small light gray circles represent H atoms.

As can be seen in FIG. 5, the lattice of the parental $MgTi_2O_5$ phase includes Ti atoms each having precisely four bonds to an oxygen atom and Mg atoms each having either three or five bonds to an oxygen atom. In contrast, the structural lattice of $MgTi_2O_{5-\delta}$ includes at least one Ti atom having bonds to five oxygen atoms and/or at least one Mg having only four bonds to oxygen atoms.

Figure 3:
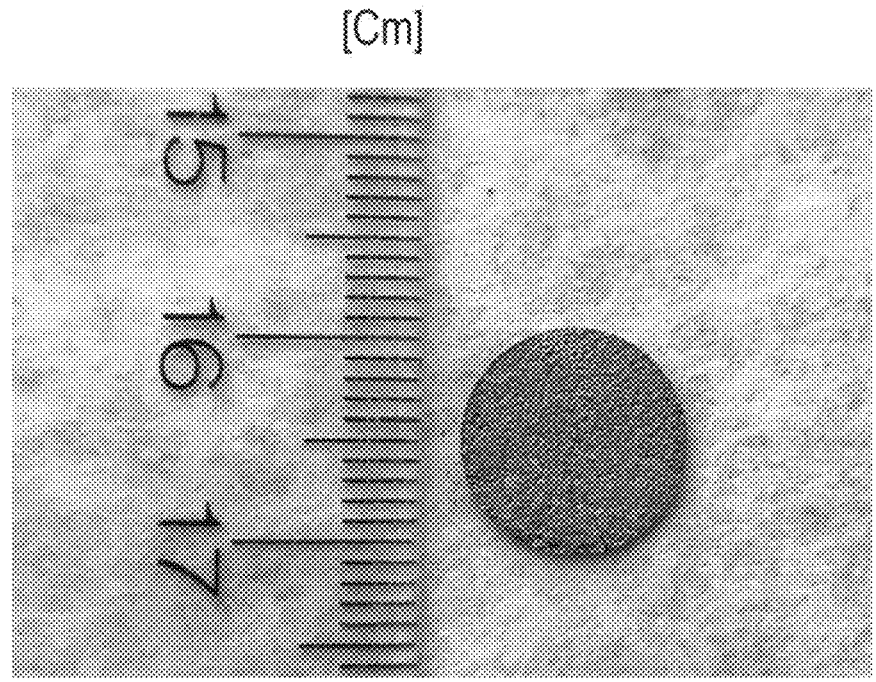
FIG. 3 shows a non-limiting example of a synthesized pellet sample of the disclosed material.

Without limiting the disclosure to a single theory, it is believed that due to presence of the oxygen vacancies, the disclosed material has very different properties than the parental phase, for example electrical conductivity as the oxygen vacancy functions as the dominant charge carrier for electrical conduction in the material. An additional difference may be observed in its physical appearance. While the parental structure is white in color, the disclosed material has a black to gray appearance with deep blue hue, indicative of the oxygen vacancies. An example of the synthesized material can be seen in FIG. 3 and the color difference, indicative of oxygen vacancies, can be seen in FIGS. 9A-9C.

The disclosed $MgTi_2O_{5-\delta}$ material may have a nominal chemical composition of about 25-40, 28-35, or 30-33 mol % MgO and 75-60, 72-65, or 70-66 mol % $TiO+TiO_2$ mixture. The Mg and Ti mol ratio Mg/Ti may be about 0.2-0.8, 0.3-0.60, or 0.4-0.5.

The disclosed material may include less than about 10 atomic % of Ti. Atomic percent relates to the percentage of one kind of atom relative to the total number of atoms. For example, the material may include about 1 to 9.9 atomic % of Ti, 2 to 8 atomic % of Ti, or 3 to 7 atomic % of Ti. Alternatively, the material may include about 1 to 3 atomic % of Ti, 1.5 to 2.8 atomic % of Ti, or 1.7 to 2.5 atomic % of Ti. The material may include about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, or 9.9% atomic % of Ti.

Since the material may be used as a catalyst support in a fuel cell application, it is desirable that the material be sufficiently electrically conductive. The disclosed material has good electrical conductivity. The $MgTi_2O_{5-\delta}$ material may have an electrical conductivity of about 1-15, 1.5-12, or 2-10 S/m at room temperature in ambient environments. The $MgTi_2O_{5-\delta}$ material may have an electrical conductivity of about, at least about, or up to about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 10.5, 11, 11.5, 12, 12.5, 13, 13.5, 14, 14.5, or 15 S/m, or any range in between, at room temperature in ambient environments.

Electrical conductivity may be expressed via a bandgap ($E_g$), also called an energy gap. The band gap refers to the energy difference between the top of the valence band and the bottom of conduction band. Substances with large bandgaps are typically insulators, and those with smaller bandgaps are called semiconductors. Conductors either have no or zero bandgap (i.e., metallic) or very small bandgaps such as (<1 eV) (i.e., semi-metallic).

The first-principles DFT calculations were carried out to examine conductive behavior of $MgTi_2O_{5-\delta}$. The calculations were carried out within the Vienna Ab-initio Simulation Package (VASP) with projected augmented wave potentials and Perdew-Burke-Ernzerhof (PBE) formulation of the generalized gradient approximation (GGA). A plane-wave basis set cutoff energy of 520 eV was used.

Figure 4A:
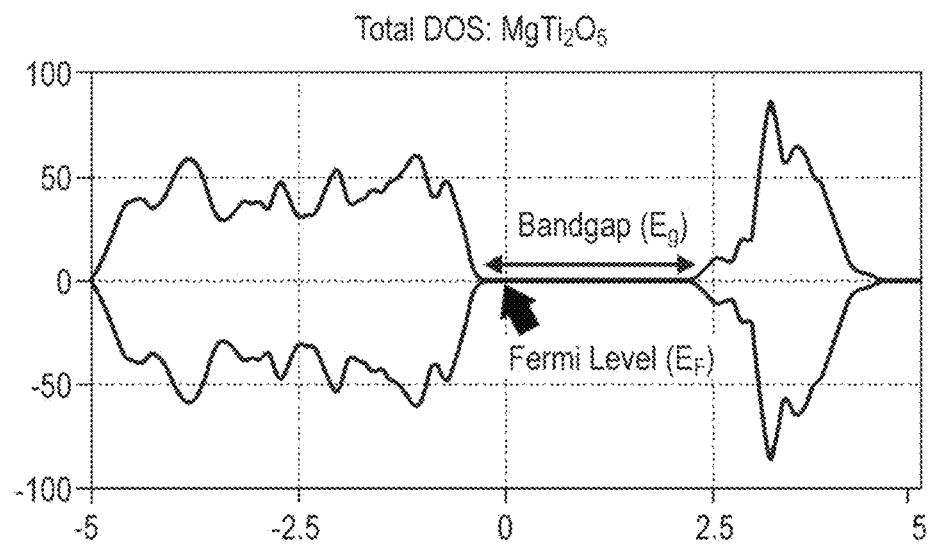
FIGS. 4A and 4B show density of state (DOS) of a $MgTi_2O_5$ structure indicating insulating behavior and $MgTi_2O_{4.92}$ indicating electrically conducting behavior, respectively.

For the atomistic simulation, the supercell of orthorhombic Cmcm $MgTi_2O_5$ (space group No. 63) with 12 formula unit was used with the k-point mesh of 3×3×3. From the density of state (DOS) simulation of FIG. 4A, it was found that the DFT bandgap of bulk-$MgTi_2O_5$ was greater than 2 eV, which indicates that the parental structure $MgTi_2O_5$ is an insulator. The Fermi level ($E_F$) was set at x=0. Below the fermi level ($E_F$) is the occupied state; and, above the fermi level is unoccupied state.

Figure 4B:
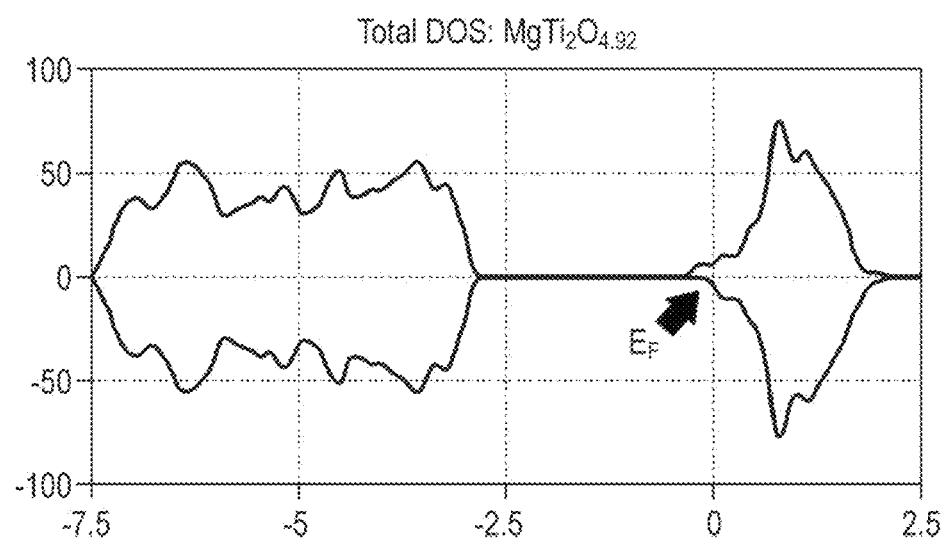

In contrast, as is shown in FIG. 4B, the presence of oxygen vacancy in the bulk $MgTi_2O_5$ structure changes the electric conductivity of the material. The Fermi level ($E_F$) of an example specimen of the disclosed material, $MgTi_2O_{4.92}$, is shifted compared to the parental structure. The $E_F$ is occupied (i.e., metallic), which indicates that $MgTi_2O_{5-\delta}$ is exhibiting its conducting behavior, which was further verified by experiments discussed below.

The DFT calculations were also utilized to assess anti-corrosive behavior of the disclosed material. DFT slab models were tested with hydrogen adsorption and dissociation reactions. Hydrogen dissociation reactions were tested on (110) $MgTi_2O_5$, (110) $MgTi_2O_{5-\delta}$, (101) $TiO_2$ (anatase), (110) $TiO_2$ (rutile), and (001) TiO structures of which are shown in FIG. 5. Each slab model was tested for maximum hydrogen coverage. Table 1 below shows the hydrogen adsorption energy ($\Delta E_{ads,H}$) and maximum hydrogen coverage ($\theta_{H,cov}$) in each slab model.

TABLE 1

Calculated Hydrogen adsorption energy ($\Delta E_{ads,H}$) and maximum hydrogen coverage ($\theta_{H,cov}$)

| | $MgTi_2O_5$ | $MgTi_2O_{5-\delta}$ | $TiO_2$ (anatase) | $TiO_2$ (rutile) | TiO |
|---|---|---|---|---|---|
| $\Delta E_{ads,H}$ [eV/H] | 0.876 | 1.159 | 1.010 | 0.960 | 1.045 |
| $\theta_{H,cov}$ [%] | 71.4 | 30.8 | 100 | 100 | 100 |

As Table 1 shows, (110) $MgTi_2O_{5-\delta}$ has the largest hydrogen adsorption energy, compared to other tested chemical species. This finding directly correlates to the highest H resistivity for (110) $MgTi_2O_{5-\delta}$ among the group of the tested species. In addition, (110) $MgTi_2O_{5-\delta}$ shows a minimum hydrogen coverage (i.e., least hydrogen dissociation).

Thus, the catalyst support material including $MgTi_2O_{5-\delta}$ is chemically stable in acidic environment and has high electrochemical stability against corrosion and oxidation environments during fuel cell operation conditions, as is demonstrated herein. The catalyst support material including $MgTi_2O_{5-\delta}$ with the catalyst material has shown excellent activity towards ORR due to strong electronic interaction between the support material and the catalyst material.

Additionally, DFT calculations were performed to construct the interface between a Pt metal catalyst and $MgTi_2O_{5-\delta}$. DFT calculations were carried out within the Vienna Ab-initio Simulation Package (VASP) with projected augmented wave potentials and Perdew-Burke-Ernzerhof (PBE) formulation of the generalized gradient approximation (GGA). A plane-wave basis set cutoff energy of 520 eV was used. The DFT calculations were used to verify that Pt and $MgTi_2O_{5-\delta}$ may form a stable interface, which may enable utilization of $MgTi_2O_{5-\delta}$ as an oxide support material for a PEMFC catalyst.

Table 2 below shows the DFT-calculated interfacial energy between a Pt catalyst and $MgTi_2O_{5-\delta}$ support. Specifically, energetically-stable Pt surface facets (111), (100), and (110) were examined on the (110) $MgTi_2O_{5-\delta}$. Table 2 illustrates that the calculated DFT interfacial energies between (110) $MgTi_2O_{5-\delta}$ and Pt catalyst (regardless of the facets) are predicted to be a negative value. A negative DFT interfacial energy indicates that two chemical systems will form a stable interface. Table 2 further shows DFT interfacial energies of Pt on $TiO_2$ and $SnO_2$ for comparison. As can be seen in Table 2, the interfacial energy for $MgTi_2O_{5-\delta}$ and $SnO_2$/$TiO_2$ are comparable. For the DFT calculations, $\Delta E_{int} = E_{0,total} - (E_{0,Pt,surf} + E_{0,MOx})$, where the internal energy ($E_0$) may be obtained from the DFT calculations.

TABLE 2

Calculated DFT interfacial energy ($\Delta E_{int}$) between a Pt catalyst and various oxide support materials

| DFT interface between Pt surface and an oxide support material | $\Delta E_{int}$ [J/m²] | FIG. |
|---|---|---|
| (111) Pt ∥ (110) $MgTi_2O_{5-\delta}$ | −1.83 | 13B, 13E |
| (100) Pt ∥ (110) $MgTi_2O_{5-\delta}$ | −2.01 | 13A, 13D |
| (110) Pt ∥ (110) $MgTi_2O_{5-\delta}$ | −1.35 | 13C, 13F |
| (111) Pt ∥ (101) $TiO_2$ (Anatase) | −1.48 | — |
| (111) Pt ∥ (110) $SnO_2$ (Rutile) | −1.93 | — |

FIGS. 13A-F show the constructed interfaces between various Pt surface facets and (110) $MgTi_2O_{5-\delta}$ before and after the DFT relaxation calculations. Specifically, FIGS. 13A-C show the constructed interfaces before DFT relaxation, FIGS. 13D-F show the interfaces after DFT relaxation. It is apparent from FIGS. 13D-F that after the DFT relaxation, Pt(100) and Pt(111) on $MgTi_2O_{5-\delta}$ look very similar to each other.

Table 2 further shows that (100) Pt may bind most strongly on (110) $MgTi_2O_{5-\delta}$, while (110) Pt may bind less strongly on (110) $MgTi_2O_{5-\delta}$. While the (111) facet seems to be the most energetically favored surface facet in Pt nanoparticles, (110) and (100) are also observed at the corner and edge of the Pt particles. Depending on the synthesis temperature, time, pH, precursor materials, and route, it is possible to control the size and shape of Pt nanoparticles, as shown in FIG. 14. Table 2 indicates that all Pt facets bind on $MgTi_2O_{5-\delta}$; (100) and (111) facets may bind more strongly than (110). Thus, regardless of the size and shape of the Pt catalyst particles, DFT calculations suggest that a stable interface between the Pt catalyst and $MgTi_2O_{5-\delta}$ will form.

Conductive and anti-corrosive behavior of the disclosed material as a catalyst support was further investigated. Table 3 below shows DFT binding energies ($\Delta E_b$) of $H_2O$ and $H_3O$ on Pt supported by various metal oxide supports. Relative binding energies ($\Delta E_{rel,b}$) are also provided, where the binding energies on pure Pt (111) are used as the reference (i.e., zero energy). The calculated binding energies of $H_2O$ and $H_3O$ of Pt supported on $MgTi_2O_{5-\delta}$ are between Pt supported on $SnO_2$ and $TiO_2$. This indicates that Pt on $MgTi_2O_{5-\delta}$ may provide more stability than Pt supported on $SnO_2$ while it can provide more reactivity compared to Pt supported on $TiO_2$.

TABLE 3

DFT binding energies ($\Delta E_b$) of $H_2O$ and $H_3O$ on Pt supported by various metal oxide supports

| DFT interface between Pt surface and an oxide support material | $\Delta E_{b, H2O}$ [eV] | $\Delta E_{rel,b, H2O}$ [eV] | $\Delta E_{b, H3O}$ [eV] | $\Delta E_{rel,b, H3O}$ [eV] |
|---|---|---|---|---|
| (111) Pt ∥ (110) $MgTi_2O_{5-\delta}$ | −0.311 | −0.157 | −0.634 | −0.227 |
| (100) Pt ∥ (110) $MgTi_2O_{5-\delta}$ | −0.217 | −0.063 | −0.588 | −0.181 |
| (110) Pt ∥ (110) $MgTi_2O_{5-\delta}$ | −0.309 | −0.155 | −0.497 | −0.090 |
| (111) Pt ∥ (101) $TiO_2$ (Anatase) | −0.080 | +0.074 | −0.349 | +0.058 |
| (111) Pt ∥ (110) $SnO_2$ (Rutile) | −0.492 | −0.338 | −0.837 | −0.430 |
| Pure (111) Pt | −0.154 | — | −0.407 | — |

As can be seen in Table 3, the relative binding energies of $H_2O$ for Pt on $MgTi_2O_{5-\delta}$ range between −0.063 and −0.157 eV. For the case of $H_3O$, the binding energies vary from −0.090 eV to −0.027 eV. For both of these cases, the binding energies are lower than Pt supported on $TiO_2$, while higher than Pt supported on $SnO_2$. Thus, as was stated above, Pt on $MgTi_2O_{5-x}$ may have more "stability" against the reactant than Pt supported on $SnO_2$ and may have more "reactivity" than Pt on $TiO_2$. Additionally, the $MgTi_2O_{5-\delta}$ material's anti-corrosive behavior and enhanced electronic conductivity discussed above and referenced in FIGS. 6 and 10, respectively, provides an additional advantage for the $MgTi_2O_{5-\delta}$ material to be used as a catalyst support over the current state-of-the-art $TiO_2$ and $SnO_2$ catalyst support systems.

The $MgTi_2O_{5-\delta}$ catalyst support material may be prepared by a variety of methods including, but not limited to a solution-based process, a solid-state process, a heat-treatment, and/or electrochemical methods. In one or more embodiments, a method of preparing the $MgTi_2O_{5-\delta}$ material is disclosed. The synthesis may include preparing dry powders of MgO, TiO, and/or $TiO_2$. The method may include forming a mixture of the MgO, TiO, and/or $TiO_2$. The method may include mixing a first powder of MgO and a second powder premixture of $TiO/TiO_2$ or TiO. The method may include drying the one or more compounds to be included in the mixture. Drying may be conducted in vacuum or ultra-high vacuum, $N_2$, Ar, or $Ar/H_2$ environment. Ultra-high vacuum refers to a regime of pressures lower than about $10^{-7}$ pascal or 100 nanopascals ($10^{-9}$ mbar, ~$10^{-9}$ torr).

The process may include compressing the mixture into any shape or configuration, for example in a mold. A non-limiting example may be compressed pellets. The compressed mixture may be heated by sintering for an amount of time. Sintering is a process of compacting and forming a solid mass of a material by heat and/or pressure without melting it to the point of liquefication or the material's melting point.

The amount of time may be an amount needed for the powder particles to fuse together and create a solid piece, and/or for the compressed material to change appearance from light gray to blue-black. The sintering may be carried out at a temperature which is below the powder mixture's melting point. The temperature may range from about 400 to 2000° C., 800 to 1800° C., or 1200 to 1500° C. in vacuum, $N_2$, Ar, or $Ar/H_2$ environment.

The amount of oxygen vacancies may be tailored depending on the needs of a specific application. The amount of oxygen vacancies may be introduced, controlled, or altered by controlling, adjusting, or maintaining the sintering temperature. The amount of oxygen vacancies may be controlled by the $TiO/TiO_2$ ratio in the powder mixture. The $TiO/TiO_2$ ratio may be about 0:100, 1:99, 10:90, 20:80, 30:70, 40:80:50:50, 60:40, 70:30, 80:20, 90:10, 99:1, or 100:0.

It was surprisingly discovered that in contrast to sintering, annealing in oxygen environment destroys oxygen vacancies in the disclosed material. Since the oxygen vacancies are desirable in the disclosed material, annealing in the presence of oxygen, as a process of minimizing crystal defects through a heat treatment and involving heating a material above its recrystallization temperature, maintaining a suitable temperature for a certain amount of time, and then cooling in air, should be avoided.

The $MgTi_2O_{5-\delta}$ catalyst support material may be undoped, and/or doped partially with nitrogen, carbon, fluorine, the like, or other elements to further enhance electronic conductivities. Non-limiting examples of other elements may include other $d^0$ metals such as $Zr^{4+}$, $Hf^{4+}$, $V^{5+}$, and/or $Cr^{6+}$, and/or $d^{10}$ metals such as $Zn^{2+}$, $Ga^{3+}$, and/or $Pb^{4+}$, as well as $Al^{3+}$ (no d electrons), where $d^0$ and $d^{10}$ metals and $Al^{3+}$ are typically more difficult to be oxidized.

A non-limiting example preparation method may include dissolving metal-containing precursor chemicals such as $M(NO_3)_x$, $MCl_x$, $M(OH)_x$, and $MO_x$, where M=Mg and Ti in a solvent to form an initial mixture. The solvent may be water or an organic solvent. The pH of the solution may be adjusted, maintained, or controlled by the presence of oxidizing or reducing chemicals. The initial mixture may be heat-treated between about 100 to 2000° C., 200 to 1500° C., or 300 to 1000° C. with a various aging time of about 1, 2, 3, 4, 8, 12, 16, 24, 36, 48, 60, or 72 hours to form the catalyst support material. During the heat treatment, the gas environment may be controlled by $N_2$, Ar, $H_2$, $O_2$, air, and/or vacuum. A catalyst material such as Pt may be deposited on the catalyst support material afterwards, either using solid-state, solution-based method, and/or various deposition techniques described below.

Various size of oxide precursor materials such as MgO, TiO, $TiO_2$, $Mg(OH)_2$, or the like may be mixed and synthesized via a solid-state method such as a ball-milling process, followed by a secondary heat treatment.

The $MgTi_2O_{5-\delta}$ catalyst support may be prepared into high surface area particles by a hydrothermal method followed by a subsequent annealing process in an oxygen-free atmosphere. The non-limiting example BET of the $MgTi_2O_{5-\delta}$ catalyst support may be about 100 to 1500, 150 to 850, or 200 to 550 m²/g. The non-limiting example BET of the $MgTi_2O_{5-\delta}$ catalyst support may be about, at least about, or up to about 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 m²/g or any range in between. In comparison, Vulcan XC-72 material typically has BET specific area of 250 m²/g; high surface area carbons may have the BET specific area of up to about 1,500 m²/g: e.g., Ketjen Black EC 600JD, Ultra High Surface Area Carbon (USAC), and so on.

Another non-limiting example BET area of the $MgTi_2O_{5-\delta}$ catalyst support may be below 100 m²/g such as 0.1 to 99, 1 to 50, or 5 to 25 m²/g. The BET area of the $MgTi_2O_{5-\delta}$ catalyst support may be about, at least about, or up to about 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.5, 6.0, 6.5, 7.0, 7.5, 8.0, 8.5, 9.0, 9.5, 10, 11, 12, 13, 14, 15, 16, 17, 18, 19, 20, 22, 24, 26, 28, 30, 32, 34, 36, 38, 40, 42, 44, 46, 48, 50, 55, 60, 65, 70, 75, 80, 85, 90, 95, or 99 m²/g or any range in between.

Alternatively, the $MgTi_2O_{5-\delta}$ catalyst support material may be prepared by a chemical reaction under a relatively high temperature of about 400 to 2000° C., 800 to 1800° C., or 1200 to 1500° C. in vacuum, $N_2$, Ar, or $Ar/H_2$ environment followed by mechanical milling. The preparation atmosphere should be kept free of oxygen such that oxygen is not supplied during the reaction and is actively removed from the reaction environment. $MgTi_2O_{5-\delta}$ catalyst support material may be prepared by a colloidal synthesis route followed by subsequent annealing steps in varying atmosphere. The catalyst support may be prepared by a combustion synthesis or flame synthesis method followed by subsequent annealing steps in an oxygen-free environment.

In at least one embodiment, the catalyst nanoparticles may be deposited onto the $MgTi_2O_{5-\delta}$ support material either forming one or more island(s) of catalyst on the catalyst support, as is shown in FIG. 11A or in a core-shell-type configuration, $MgTi_2O_{5-\delta}$ forming the core and the catalyst forming the shell, as is depicted in FIG. 11B. In FIGS. 11A and 11B, 50 denotes the catalyst support and 52 denotes the catalyst. A specific configuration may be tailored depending on the expected performance, cost, and lifetime of the PEMFC device and/or stack system. Scanning electron microscope (SEM) cross-section images of $MgTi_2O_{5-\delta}$ serving as a catalyst support material and Pt used as a catalyst are shown in FIGS. 12A and 12B. The catalyst support material may have even or uneven surface. The catalyst support material may serve as a substrate for the catalyst material. The catalyst support material may physically and/or chemically bind the catalyst.

Since the goal is to form and preserve the oxygen vacancies to ensure preservation of valuable properties of the material described herein such as electrical conductivity, certain process conditions and parameters applicable to synthesis of materials lacking oxygen vacancies may be unsuitable. For example, a process including templating colloids with embedded catalyst particles into a support matrix yielding a porous structure may be unsuitable due to the removal of colloids from the system by calcination or dissolution. Synthesis of the $MgTi_2O_{5-\delta}$ catalyst support material requires temperatures and environment which could destroy the catalyst particles to be embedded in the support material. For example, $MgTi_2O_{5-\delta}$ catalyst support material may be deposited by sintering at temperatures of up to about 1400° C. Additionally, synthesizing the $MgTi_2O_{5-\delta}$ catalyst support material within a porous structure may be overly demanding and impractical.

Thus, an alternative process may be used. The process may include synthesizing the $MgTi_2O_{5-\delta}$ material as nanoparticles, for example by using sputtering and/or sintering. Alternatively, the $MgTi_2O_{5-\delta}$ material nanoparticles may be formed by vapor phase sublimation, thermal evaporation, electron beam evaporation, high-energy ball-milling, spray pyrolysis, chemical vapor deposition, co-precipitation, hydrothermal synthesis, inert gas condensation, ion sputtering scattering, microemulsion, microwave, pulse laser ablation, sol-gel, sonochemical, spark discharge, template synthesis, biological synthesis, the like, by a process described above, or a combination thereof. The synthesized nanoparticles may be in the order of about, at most about, or at least about 5 to 1000 nm, 50 to 500 nm, or 100 to 250 nm. The synthesized nanoparticles' radius or diameter may be in the order of about, at most about, or at least about 5 to 1000 nm, 50 to 500 nm, or 100 to 250 nm.

Afterwards, the nanoparticles may be coated with a polymeric material. The polymeric material may be amorphous or crystalline. The polymeric material may be rigid, brittle. The polymeric material may be foaming or form a foam. The polymeric material may be thermally insulating. The polymeric material may be polar or non-polar. The polymeric material may be a thermoplastic or a thermoset. The polymeric material may be sticky or adhere to the surface of the nanoparticles. The polymeric material may be polystyrene. The polymeric material may be a hydrocarbon-based polymer which can be dissolved in organic solvents such as acetone. The polymeric material may be polymethylmethacrylate (PMMA).

The polymeric material may be applied onto the surface of nanoparticles as a film coating or a layer. The film may cover the entire surface or a partial surface of the nanoparticles. The nanoparticles may be partially or fully coated. The layer may be continuous or discontinuous. All or at least some of the nanoparticles may include the film coating. The film may be about or at least about 0.1 to 20, 0.5 to 10, or 1 to 3 nm thick. The film may be functionalized. The film may be functionalized with thiol, sulfonate, or another compound having sulfur-based functional groups capable of binding to catalyst material surface.

The process may include attaching catalyst material onto and/or into the film coating. The catalyst material may be in a form of nanoparticles. The catalyst material may be attached to, affixed to, lodged into, incorporated into, inlaid, ingrained, pressed into, embedded, or otherwise be in contact with the coating. At least some of the catalyst particles are also in contact with the underlying $MgTi_2O_{5-\delta}$ material. The contact may be a partial contact such that only a portion of a catalyst particle is in direct contact with the support material. The catalyst particles are attached after the polymeric material is coated onto the support material.

The process may further include a step of removing the polymeric material from the $MgTi_2O_{5-\delta}$ material. The removing step may be performed after the catalyst particles are attached to the coating. The removal may be provided by heating the $MgTi_2O_{5-\delta}$ material with the coating and the catalyst nanoparticles to a threshold temperature. The threshold temperature may be a temperature which will cause melting or burning of the polymeric coating. The threshold temperature may be a melting temperature of the polymeric material and/or a higher temperature. The threshold temperature may be an annealing temperature. The threshold temperature is lower than a temperature at which the catalytic properties of the catalytic material are affected in a negative way, at which the catalyst material is damaged, at which the catalyst material melts. The removal/heating process may last at least until the polymeric material succumbs to the heat and disintegrates. The heating step may include annealing. Alternatively or in addition, the removing step may involve application of an acid or base in a liquid or vapor form.

The process may also include an additional attachment of the catalyst nanoparticles onto the surface of the $MgTi_2O_{5-\delta}$ material after the polymeric material is removed. The attachment process may be a post-heating or post-annealing process. The step may include increasing physical, electrical, and/or mechanical attachment and contact of the catalyst particles to the support material, between $MgTi_2O_{5-\delta}$ support material nanoparticles, and/or between individual catalyst nanoparticles. The step may increase electrical contact between the individual catalyst particles and between the catalyst particles and the $MgTi_2O_{5-\delta}$ support material as a working electrical contact is needed to enable delivery of electrons to the catalyst particles through the catalyst support.

The step may include additional deposition of one or more materials to keep the catalyst material in place and/or to increase the electrical, chemical, mechanical contact discussed above. The additional material may be catalytic support material, catalyst material, another material, or a combination thereof. The additional material may be provided onto the catalytic support material, onto or around the catalyst material, in close vicinity or adjacent to the catalyst material, or a combination thereof. The additional material may be applied to all particles or entire volume of the catalyst support material, the catalyst material, or both. Alternatively, the additional material may apply to only a portion of the catalyst support material or the catalyst material or only to a portion of the catalyst support particles or the catalyst particles. The additional material may be applied uniformly in the same thickness and consistency. Alternatively, the additional material may be applied in varying thickness and consistency. The additional material may fully or partially surround at least some or all of the catalyst particles. The catalyst particles may be enclosed, surrounded by, engulfed by, or embedded in the additional material. The deposition of the additional material may be done, for example, by sputtering or by deposition techniques described above with respect to the catalyst support material and the catalyst. The deposition is further discussed in U.S. patent application Ser. No. 16/694,305 and U.S. patent application Ser. No. 16/544,511, which are incorporated herein in their entirety.

A schematic depiction of the process described above is shown in FIGS. 15A and 15B. As can be seen in FIG. 15A, a $MgTi_2O_{5-\delta}$ support material nanoparticle 150 is coated with a polymeric material 151. The catalyst particles 152 are attached to the polymeric material 151 and/or the support material 150 via the polymeric material 151. Subsequently, the polymeric material 151 is removed, leaving the catalyst material 152 on the support material 150. The post-annealing step is not depicted, but may follow as described above.

In FIG. 15B, the process steps of FIG. 15A are depicted, but an additional step of depositing additional material 153 is also shown. As can be seen, the additional material 153 has been applied around the entire circumference of the catalyst support particle 150, partially surrounding all of the catalyst particles 152. The deposition of the additional material 153 is not uniform and has varying thickness.

Alternatively, the method of forming the $MgTi_2O_{5-\delta}$ support material with a catalyst material may utilize the anti-corrosive nature of the $MgTi_2O_{5-\delta}$ material. The process may include using a templating material or a base material. The templating material may be a solid, semi-solid, sol-gel, or paste material. The templating material may be in the form of nanospheres. The nanospheres may have a diameter or radius of about or at least about 5 to 1500, 100 to 1000, or 200 to 500 nm. The nanospheres may have the same, uniform, or different size. The nanospheres may have the same or similar size as the $MgTi_2O_{5-\delta}$ nanoparticles. The nanospheres may have a different size than the $MgTi_2O_{5-\delta}$ nanoparticles such that the nanospheres are larger or smaller than the $MgTi_2O_{5-\delta}$ nanoparticles. A non-limiting example of the templating material may be silica nanospheres. Other oxide materials which can be dissolved in strong acids or strong bases may also be used, for example alumina, titania, or their combination. The process may include agglomerating, compacting, gathering, assembling, amassing, or bringing together the templating material such as a plurality of the templating nanospheres to form a templating layer. The templating material may form clusters, agglomerates of particles, or a layer featuring initial gaps in between the individual particles, agglomerates, or clusters. The templating layer may include initial pores, gaps, or vacancies between individual nanospheres. The initial pores, gaps, or vacancies may be regularly or irregularly shaped and/or spaced apart. The templating material nanospheres may be compacted to fuse at least some of the touching edges of the nanospheres. The fusing may be provided by annealing at about 500 to 100, 600 to 900, or 700 to 800° C.

The process may include sputtering or otherwise depositing $MgTi_2O_{5-\delta}$ material precursors such as MgO and TiO or $MgTi_2O_{5-\delta}$ material onto the and/or in between the templating material nanospheres, particles, or clusters of the templating material. An alternative deposition method may be vapor deposition, atomic layer deposition (ALD) done at relatively low temperature of less than about 150, 300, or 500° C. to control the composition of $MgTi_2O_{5-\delta}$, physical vapor deposition (PVD) such as sputtering, which may be accomplished at low temperature of less than about 300, 250, or 200° C., vapor phase sublimation, thermal evaporation, electron beam evaporation, or chemical vapor deposition. In a yet another embodiment, the $MgTi_2O_{5-\delta}$ material may be deposited in a liquid or sol-gel deposition to fill in spaces between individual portions of the templating material. The liquid or sol-gel would include a mixture of $MgTi_2O_{5-\delta}$ precursors.

Subsequently, the $MgTi_2O_{5-\delta}$ material precursors or the $MgTi_2O_{5-\delta}$ material within the templating material may be annealed in the temperature ranges discussed herein such as about 1400° C. in an oxygen-free environment to form the desired $MgTi_2O_{5-\delta}$ phase and the desired amount of oxygen vacancies.

The process may also include removal of the templating material from the system by dissolving the nanospheres or another templating material used. The dissolution step may be performed after formation of the $MgTi_2O_{5-\delta}$ material within the pores of and around the templating material. The dissolution may be performed using a substance capable of dissolving the nanospheres but preserving and not negatively affecting the $MgTi_2O_{5-\delta}$ material and the oxygen vacancies. The dissolution may be performed using an acid because the $MgTi_2O_{5-\delta}$ material is anti-corrosive and can withstand acidic environment. The acid may be used in a liquid or vapor form. An example acid may be hydrofluoric (HF) acid, but the choice of the acid is not particularly limited as long as the $MgTi_2O_{5-\delta}$ material and the oxygen vacancies are able to withstand the dissolution step. The resulting matrix includes one or more secondary pores, gaps, or vacancies, where the templating material was previously present. The secondary pores, gaps, or vacancies may be regularly or irregularly shaped and/or spaced apart. The acid-resistant matrix may resemble a Swiss cheese structure.

The process may include depositing catalyst material into the secondary pores. The deposition may be performed by sputtering or dispersion of the catalyst particles within the pores. The application of the catalyst material within the pores may be uniform, regular, or irregular. All of the pores may include at least one deposited catalyst particle. At least some of the pores may include more or less catalyst particles than at least one other pore. The depositing of the catalyst material may be performed after the templating material is removed from the system.

The $MgTi_2O_{5-\delta}$ material with the distributed catalyst particles may be annealed in an oxygen-free environment to further attach the catalyst particles to the $MgTi_2O_{5-\delta}$ material, to strengthen the mechanical and electrical contact between the catalyst particles, the support material, and their combination. The attaching may include an annealing process conducted at about low temperature of about or less than about 300, 250, or 200° C., preferably in oxygen-free environment.

A schematic depiction of the process is shown in FIG. 16. FIG. 16 shows the templating material 254 in the form of nanospheres and initial gaps 256 between the nanospheres of the templating material. The acid-resistant matrix of the $MgTi_2O_{5-\delta}$ material 250 is deposited around the templating material 254, into the initial gaps 256. The $MgTi_2O_{5-\delta}$ material 250 and the templating material 254 are exposed to an acid which dissolves the templating material 254, but does not attack, damage, alter, or dissolve structure of the $MgTi_2O_{5-\delta}$ material 250. The dissolving step results in formation of one or more additional pores or gaps 258 within the acid-resistant matrix 250. A catalyst material 252 is then applied within the one or more pores 258 such that the acid-resistant matrix of the $MgTi_2O_{5-\delta}$ material 250 serves as the catalyst support material.

The catalyst support material may include other substances besides the $MgTi_2O_{5-\delta}$ material. The $MgTi_2O_{5-\delta}$ catalyst support material may be mixed with carbon and/or another type of conductive polymer to increase conductivity. Carbon includes, but is not limited to, amorphous carbon, Denka black, Ketjen black, acetylene black, carbon nanotube, carbon fibers, graphene, graphite, graphyne, graphene oxide, reduced graphene oxide, etc. The ratio of the mixture may be about 1:1, 1:2, 1:3, 1:4, 1:5, 1:6, 1:7, 1:8, 1:9, 1:10, 10:1, 9:1, 8:1, 7:1, 6:1, 5:1, 4:1, 3:1, or 2:1. Alternatively, carbon and/or another type of additional support material may form one or more additional sublayers, serving as a support for the disclosed material.

The MgTi$_2$O$_{5-x}$ catalyst support material may be mixed with one or more types of catalyst support materials such as oxide, carbides, or intermetallic compounds. Example oxide materials may include SnO$_2$, MoO$_3$, Nb$_2$O$_5$, Ta$_2$O$_5$, TiO$_2$, WO$_3$, SnMo$_4$O$_6$, and/or TiNb$_3$O$_6$, GeO$_2$, MoO$_2$, NbO$_2$, SnO, Ti$_3$O$_5$, SnWO$_4$, WO$_2$, Nb$_2$SnO$_6$, Sn$_2$WO$_5$, SnGeO$_3$, Ta$_2$SnO$_6$, TiSn$_2$O$_4$, Ti$_6$O, or mixtures thereof. Example carbides may include Nb$_6$C$_5$, Mo$_2$C, Ta$_2$C, Ti$_8$C$_5$, WC, TaC, Nb$_2$SnC, Ti$_2$GeC, Ti$_3$SnC$_2$, Ti$_3$GeC$_2$, MoC, or mixtures thereof. Non-limiting examples of binary or ternary intermetallic compounds may be MoW, NbSn$_2$, Nb$_3$Sn, Sn$_2$Mo, TaSn$_2$, Ta$_3$Sn, TaW$_3$, TiMo, TiMo$_3$, Ti$_2$Mo, Ti$_3$Mo, TiNb, Ti$_2$Sn, Ti$_2$Sn$_3$, Ti$_3$Sn, Ti$_6$Sn$_5$, NbMo$_2$W, TaMo$_2$W, TiMo$_2$W, Ti$_2$NbSn, GeMo$_3$, Ge$_2$Mo, NbGe$_2$, Nb$_5$Ge$_3$, SnGe, TaGe$_2$, Ta$_3$Ge, Ta$_5$Ge$_3$, TiGe$_2$, Ti$_5$Ge$_3$, Ti$_6$Ge$_5$, or mixtures thereof. Depending on the secondary heat-treatment conditions such as temperature, presence of oxidizing/reducing agents, the amount of oxides (as well as their compositions) in the surface film and bulk region of the intermetallic component may be further controlled.

EXAMPLES

Set A

To verify the DFT-derived results, the disclosed material was synthesized and tested according to the methods described below.

The disclosed material was synthesized by the following method using a dry MgO, TiO and TiO$_2$ powder mixture. MgO powder was dried at 120° C. for 2 hours in Ar environment. The dried powder was then mixed with TiO/TiO$_2$ powder to form a mixture. The mixture was pressed into pellets measuring about 12 mm in diameter and 2 mm in thickness under 3000 psi uniaxial load. The as-pressed pellets had a light grey color. The compacted pellets were then loaded in a Al$_2$O$_3$ crucible and heated-up for reactive sintering (e.g. at 1450° C.) in vacuum environment (10$^{-3}$ torr) for 10 hours. After sintering, the pellets appeared to be black in color with a blue hue. The method was used to prepare five batches of pellets, each batch containing three to four pellets.

Five sintered pellets, one from each batch, were Au sputtered on both sides of the surface. Afterwards, the pellets were assembled in an EL-Cell® ECC cell. Constant current was applied and voltage values were recorded after about 10 min until the voltage reading stabilized. This step was repeated several times at different currents. Resistance and DC electrical conductivity was calculated by linear slope from fitting the V-I data.

FIG. 6 shows an Arrhenius plot of conductivities from 25° C. to 80° C. Average conductivity and an error bar were calculated from seven different samples made from different batches. The disclosed crystalline MgTi$_2$O$_{5-\delta}$ material showed an electrical conductivity of about 2-10 S/m at room temperature in ambient environments. The measured conductivity is higher than semiconductor such as Ge and Si while slightly lower than carbon, iron, and gold. The material's activation energy was about 0.13 eV in the temperature ranges between 25° C. to 80° C.

X-ray photoemission spectroscopy (XPS) and optical microscopy was used to assess physical characteristics of the disclosed material in several pellets from two different batches. For the purposes of the observation, some of the pellets were annealed. The pellets were compared to comparative pellets of TiO$_2$. The XPS studies of the pellets were performed using a PHI XPS system equipped with an Al X-ray source (incident photon energy of 1486.7 eV). The aperture size was set to about 1.1 mm in diameter. The binding energy of the obtained XPS spectra was calibrated with respect to the C is peak of adventitious carbon at 284.8 eV.

Figure 7:
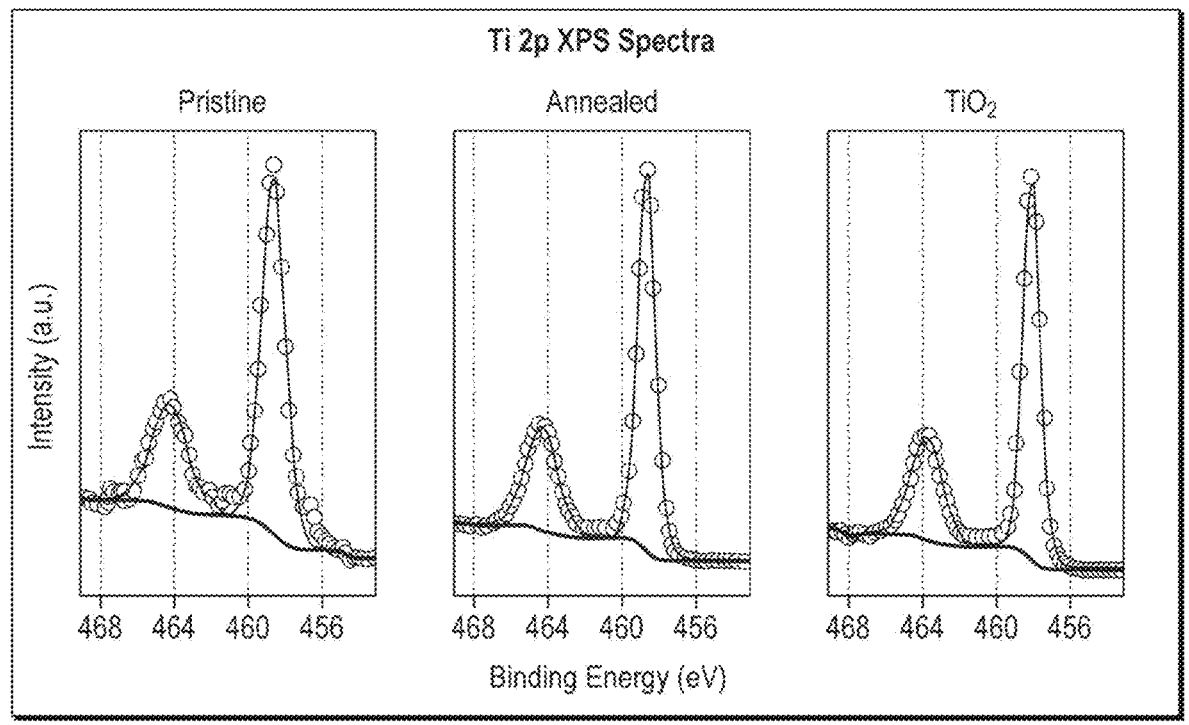
FIG. 7 shows Ti 2p X-ray photoemission spectroscopy (XPS) spectra of the pristine as-synthesized $MgTi_2O_{5-\delta}$, $MgTi_2O_{5-\delta}$ after being annealed in air, and of $TiO_2$.
Figure 8:
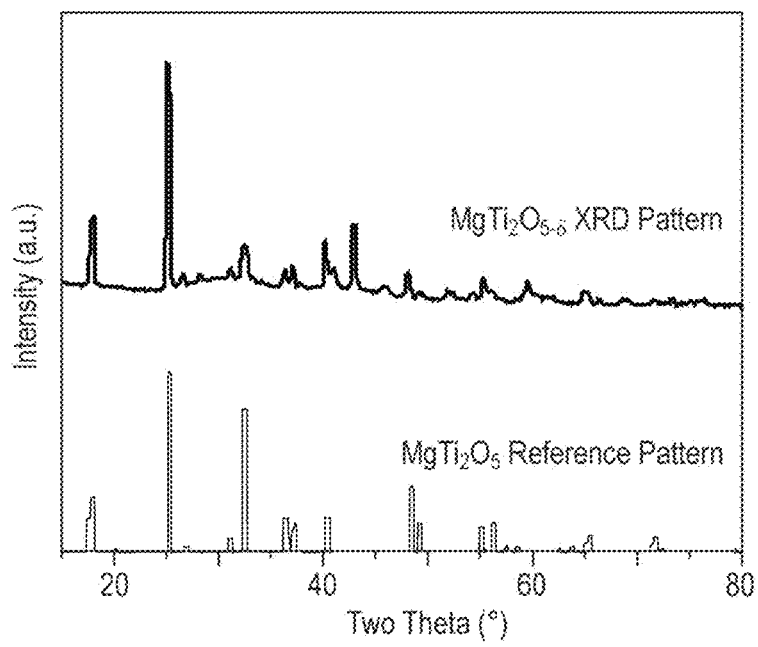
FIG. 8 is an X-ray diffraction (XRD) pattern of as synthesized $MgTi_2O_{5-\delta}$ versus $MgTi_2O_5$.

FIG. 7 shows Ti 2p XPS spectra of the pellets containing the disclosed material in its pristine state, pellets including the disclosed material annealed in air, and TiO$_2$ reference pellets. The collected data suggests that Ti in the pellets containing the disclosed material in its pristine state is dominantly Ti 4+ state, similar to Ti in the pellets including the disclosed material annealed in air and in the TiO$_2$ reference pellets. The observation and the XRD analysis also suggest that the disclosed material has a similar, but not identical, crystal structure to MgTi$_2$O$_5$, as can be seen in FIG. 8.

The sintered pellets were assessed optically. The surface of the sintered pellets can be seen in FIG. 9A, showing as synthesized pellets featuring black and blue hue on the pellet surface. Three of the sintered pellets were annealed in air at 600° C. for 10 hours. Surface of the annealed pellets changed partially at the edges of the pellets and some of the surface regions of the pellets turned white while some of the surface remained black, as can be observed in FIG. 9B. The annealed pellets were further exposed to additional annealing in air at 1000° C. for 10 hours. The entire surface of the pellets turned white after the secondary round of annealing as can be seen in FIG. 9C. Optical images of the pellets shown in FIGS. 9A-C were collected using a Keyence VHX microscope at magnifications ranging from 100× to 1000×.

Electrical conductivity was assessed for the as-synthesized pellets at about 1.7-8 S/m while the annealed pellets shown at FIG. 9B were found to be less conductive than the as-synthesized pellets at 0.36 S/m. The annealed pellets shown at FIG. 9C were assessed as insulating. The results suggest that the color and its electrical conduction are correlated to oxygen vacancies in the material. Without limiting this disclosure to a single theory, it is believed that annealing in air removes oxygen vacancies, which then leads to color change and loss of electrical conductivity. FIGS. 9A-C imply that oxygen vacancy is the main charge carrier for electrical conduction in the disclosed material. When oxygen vacancy is eliminated by the annealing process in air at 1000° C. or otherwise, the material transitions to an insulator.

The as synthesized pellets were further tested for corrosion resistance. Corrosion current measurements were carried out in a three-electrode liquid cell setup. Counter electrode was about 16 cm$^2$ Pt-mesh. The reference electrode was a standard Ag/AgCl electrode in KCl solution. Pellets were used as the working electrode with an effective area of about 0.5 cm$^2$. For each measurement, one pellet was measured at a time. In total, three pellets were measured. For static corrosion current measurement, pH=2 sulfuric acid was used as electrolyte at 60° C. Static corrosion current was recorded at 1.0 V bias vs Ag/AgCl reference electrode.

The results of the corrosion current measurements are shown in FIG. 10. Corrosion current density for the as-synthesized, pristine disclosed material is shown on the bottom, carbon paper on top, and polished stainless steel (SS) 316 in the middle. The pristine MgTi$_2$O$_{5-\delta}$ material's corrosion current density was assessed to be about two orders of magnitude better/lower than the polished SS316 and carbon paper. In other words, corrosion current measured in MgTi$_2$O$_{5-\delta}$ showed that the MgTi$_2$O$_{5-\delta}$ produces ×100 times smaller steady corrosion current when compared to SS316. Overall, the crystalline MgTi$_2$O$_{5-\delta}$ material demonstrated good corrosion resistance in acidic environment.

The MgTi$_2$O$_{5-\delta}$ material may have corrosion resistance (static corrosion current density) of less than about 0.5-5, 1-3, or 1.5-2.5 μA cm$^{-2}$ at pH of 2 at a temperature of about 0 to 80° C., 10 to 60° C., or 20 to 40° C. The MgTi$_2$O$_{5-\delta}$ material may have corrosion resistance of less than about 5.0, 4.0, 3.0, 2.5, 2.0, 1.8, 1.6, 1.4, 1.2, 1.0, 0.9, 0.8, 0.7, 0.6, 0.5, 0.4, 0.3, 0.2, or 0.1 μA cm$^{-2}$ at pH of 2 at a temperature of about 0 to 80° C., 10 to 60° C., or 20 to 40° C.

The pellets were also tested for chemical resistivity or inertness. Chemical inertness relates to the material's reactivity with compounds present in the acidic fuel cell environment such as H$_3$O$^+$, F$^-$, and SO$_4^-$. One pristine pellet was crushed into powder, which was tested in Aqua Regia (concentrated HNO$_3$ and HCl mixture with 3:1 ratio) heated to 100-150° C. The powder did not dissolve, which indicated good chemical stability.

Set B

To validate the DFT-calculated results, the disclosed material was used to form pellets by a method described under EXAMPLES, Set A above. Subsequently, a catalyst material including Pt was sputtered onto the pellets, and the catalyst support with the catalyst were exposed to annealing at 600° C. for 10 hours. FIG. 12A shows an example of one of the pellets including the sputtered catalyst before the annealing process. FIG. 12B shows one of the pellets after the annealing process. The dashed line indicates the interface between Pt and MgTi$_2$O$_{5-\delta}$ in both FIGS. 12A and B. FIGS. 12A and 12B are scanning electron microscope (SEM) cross-section images. FIG. 12B shows that the Pt catalyst bonded very well on the MgTi$_2$O$_{5-\delta}$ support surface. No phase separation was observed. The experiment showed that Pt formed a good contact with the MgTi$_2$O$_{5-\delta}$ material. Even after the heat treatment of 600° C. for 10 hours, Pt remained in intimate contact with the MgTi$_2$O$_{5-\delta}$ material surface, suggesting a good contact.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of forming a fuel cell catalyst system, the method comprising:
   providing an anticorrosive, conductive catalyst support material having oxygen vacancies and a formula (I):

$$MgTi_2O_{5-\delta} \tag{I}$$

where
   δ is any number between 0 and 3 optionally including a fractional part denoting the oxygen vacancies;
   coating the catalyst support material with a polymeric film;
   attaching a catalyst material onto the polymeric film;
   removing the polymeric film; and
   providing additional material onto the support material to increase physical, electrical, and/or mechanical contact between the catalyst material and the catalyst support material.

2. The method of claim 1, wherein the additional material includes additional catalyst support material.

3. The method of claim 1, wherein the polymeric film is polystyrene.

4. The method of claim 1, wherein the removing includes heating the catalyst system above a threshold temperature.

5. The method of claim 4, wherein the threshold temperature is a melting temperature of the polymeric film.

6. The method of claim 1, wherein the catalyst support material further comprises at least one additional oxide, carbide, or intermetallic compound.

7. The method of claim 1, wherein the catalyst material comprises a Pt-M bimetallic alloy, where M is Ag, Au, Bi, Co, Cr, Cu, Fe, Ge, Hf, Ir, Mn, Mo, Nb, Ni, Os, Pd, Re, Rh, Ru, Sb, Sn, Ta, Ti, V, or W.

8. The method of claim 1, wherein the attaching includes contacting at least some of the catalyst material with the catalyst support material.

9. A method of forming a fuel cell catalyst system, the method comprising:
   synthesizing catalyst support nanoparticles including an anticorrosive, conductive material having oxygen vacancies and a formula (I):

$$MgTi_2O_{5-\delta} \tag{I}$$

where
   δ is any number between 0 and 3 optionally including a fractional part denoting the oxygen vacancies;
   forming a polymeric layer around each of the nanoparticles;
   subsequently attaching a plurality of catalyst nanoparticles onto the polymeric layer such that at least some of the catalyst nanoparticles are in contact with the catalyst support nanoparticles; and
   removing the polymeric layer.

10. The method of claim 9, wherein the removing includes annealing the catalyst system in an oxygen-free atmosphere.

11. The method of claim 9, wherein the polymeric layer includes polystyrene.

12. The method of claim 9, wherein the removing includes heating the catalyst system above a threshold temperature.

13. The method of claim 12, wherein the threshold temperature is a melting temperature of the polymeric layer.

14. The method of claim 9, wherein the catalyst nanoparticles comprise a Pt-M bimetallic alloy, where M is Ag, Au, Bi, Co, Cr, Cu, Fe, Ge, Hf, Ir, Mn, Mo, Nb, Ni, Os, Pd, Re, Rh, Ru, Sb, Sn, Ta, Ti, V, or W.

* * * * *